United States Patent
Zahlmann et al.

(10) Patent No.: US 12,470,059 B2
(45) Date of Patent: Nov. 11, 2025

(54) OVERVOLTAGE PROTECTION DEVICE AND USE OF AN OVERVOLTAGE PROTECTION DEVICE

(71) Applicant: DEHN SE, Neumarkt i.d.OPf. (DE)

(72) Inventors: Peter Zahlmann, Neumarkt (DE); Ralph Brocke, Ilmenau/Oberpörlitz (DE); Helmut Hirschmann, Berg (DE); Edmund Zäuner, Berching/Pollanten (DE)

(73) Assignee: DEHN SE, Neumarkt i.d.OPf. (DE)

( * ) Notice: Subject to any disclaimer, the term of this patent is extended or adjusted under 35 U.S.C. 154(b) by 167 days.

(21) Appl. No.: 18/273,861

(22) PCT Filed: Jan. 25, 2022

(86) PCT No.: PCT/EP2022/051577
§ 371 (c)(1),
(2) Date: Jul. 24, 2023

(87) PCT Pub. No.: WO2022/157378
PCT Pub. Date: Jul. 28, 2022

(65) Prior Publication Data
US 2024/0429706 A1   Dec. 26, 2024

(30) Foreign Application Priority Data
Jan. 25, 2021   (DE) .......................... 102021101506.5

(51) Int. Cl.
*H02H 9/06*   (2006.01)
*H02H 9/00*   (2006.01)

(52) U.S. Cl.
CPC .............. *H02H 9/06* (2013.01); *H02H 9/005* (2013.01)

(58) Field of Classification Search
CPC ........................ H02H 9/005; H02H 9/04–06
See application file for complete search history.

(56) References Cited

U.S. PATENT DOCUMENTS 9,941,691 B2   4/2018   Strangfeld et al.
11,201,464 B2   12/2021   Brocke
(Continued)

FOREIGN PATENT DOCUMENTS

DE   102013019391 A1   10/2014   ............. H01H 37/76
DE   102016011076 A1   10/2017   ............... H02H 9/04
(Continued)

OTHER PUBLICATIONS

A the Notification Concerning Transmittal of International Preliminary Report on Patentability (Chapter I of the Patent Cooperation Treaty), in English, dated Aug. 3, 2023, which was issued by the International Bureau of WIPO in Applicant's corresponding international PCT application having Serial No. PCT/EP2022/051577, filed on Jan. 25, 2022.
(Continued)

*Primary Examiner* — Thienvu V Tran
*Assistant Examiner* — Christopher J Clark
(74) *Attorney, Agent, or Firm* — Bodner & Bodner, PLLC; Christian P. Bodner; Gerald T. Bodner

(57) ABSTRACT

The invention relates to a surge protection apparatus (10) for protecting an electrical installation against transient overvoltages, having a voltage-limiting protection component (18) and additionally a voltage-switching protection component (20). The voltage-limiting protection component (18) and the voltage-switching protection component (20) are connected in series. The voltage-limiting protection component (18) is dimensioned such that the voltage-limiting protection component (18) satisfies the condition $U_B = U_n / K_x$, where $U_B$ is the rated voltage of the voltage-limiting protection component (18), $U_n$ is a nominal voltage applied to the voltage-limiting protection component (18), and $K_x$ is a setting parameter the value of which is at least 2.

18 Claims, 2 Drawing Sheets

(56) References Cited

U.S. PATENT DOCUMENTS

| | | | |
|---|---|---|---|
| 11,749,481 B2 | 9/2023 | Ehrhardt et al. | 361/137 |
| 2007/0223171 A1* | 9/2007 | Guy | H01T 1/16 |
| | | | 361/126 |
| 2011/0299203 A1* | 12/2011 | Ruess | H02H 9/042 |
| | | | 361/56 |
| 2012/0243138 A1* | 9/2012 | Cerny | H02H 9/041 |
| | | | 361/93.8 |
| 2019/0140443 A1* | 5/2019 | Brocke | H02H 9/06 |

FOREIGN PATENT DOCUMENTS

| | | | | |
|---|---|---|---|---|
| DE | 102019101212 A1 | 1/2020 | | H01T 1/14 |
| DE | 102020121589 A1 | 3/2021 | | H01C 7/10 |
| EP | 2953142 A1 | 12/2015 | | H01C 13/02 |
| JP | H05260736 A | 10/1993 | | G05F 1/10 |
| WO | WO2020038119 A1 | 2/2020 | | H02H 3/20 |

OTHER PUBLICATIONS

A the English translation of the International Preliminary Report on Patentability (Chapter I of the Patent Cooperation Treaty), dated Jul. 20, 2023, which was issued by the International Bureau of WIPO in Applicant's corresponding international PCT application having Serial No. PCT/EP2022/051577, filed on Jan. 25, 2022.

A the Written Opinion of the International Searching Authority, in English, dated May 3, 2022, which was issued by the International Bureau of WIPO in Applicant's corresponding international PCT application having Serial No. PCT/EP2022/051577, filed on Jan. 25, 2022.

A the International Search Report, in English, dated May 3, 2022, which was issued by the International Bureau of WIPO in Applicant's corresponding international PCT application having Serial No. PCT/EP2022/051577, filed on Jan. 25, 2022.

* cited by examiner

OVERVOLTAGE PROTECTION DEVICE AND USE OF AN OVERVOLTAGE PROTECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to a surge protection apparatus for protecting an electrical installation against transient overvoltages. Furthermore, the invention relates to the use of a surge protection apparatus for protecting an electrical installation against transient overvoltages ("TOV").

(2) Description of Related Art

Surge protection apparatus are known from the prior art for overload protection of devices which are to be protected against overvoltages. The surge protection apparatus typically have a voltage-limiting element or a voltage-switching element. For example, the voltage-limiting element is a varistor such as a metal-oxide varistor ("MOV"). The voltage-switching element may be a gas discharge arrester ("GDT"). Alternatively, it is known that the voltage-switching element is formed by a horn gap.

In addition, when properly configured, surge protection apparatus known from the prior art which include a voltage-limiting element prevent a mains follow current driven by the applied mains from flowing.

Surge protection apparatus are also known from the prior art which have a voltage-limiting element and a voltage-switching element such as a gas discharge arrester ("GDT") connected in series. Here, the voltage-limiting element must be dimensioned so as to effectively suppress the flow of a mains follow current after the arresting process to prevent overloading of the surge protection apparatus. However, dimensioning can be done with a lower rated voltage such that the gas discharge arrester ("GDT") provides a disconnection from the applied mains voltage during normal operation.

However, the known surge protection apparatus cannot efficiently protect electrical installations from transient overvoltages.

BRIEF SUMMARY OF THE INVENTION

Accordingly, it is the object of the invention to provide a surge protection apparatus which protects electrical installations from transient overvoltages as efficiently as possible.

According to the invention, the object is achieved by a surge protection apparatus for protecting an electrical installation against transient overvoltages. The surge protection apparatus has a voltage-limiting protection component and additionally a voltage-switching protection component. The voltage-limiting protection component and the voltage-switching protection component are connected in series. The voltage-switching protection component is configured such that the voltage-switching protection component switches to a quasi-closed switching state for each surge current or arresting process. The voltage-switching protection component is configured such that a voltage applied to the voltage-switching protection component drops across the voltage-switching protection component in the initial state thereof such that the series-connected voltage-limiting protection component remains free from leakage currents. The voltage-switching protection component is configured to at least limit, in particular to interrupt occurring mains follow currents. The voltage-limiting protection component is dimensioned such that the voltage-limiting protection component satisfies the condition $U_B = U_n/K_x$, where $U_B$ is the rated voltage of the voltage-limiting protection component, $U_n$ is a nominal voltage applied to the voltage-limiting protection component, and $K_x$ is a setting parameter the value of which is at least 2.

The basic idea of the invention is to provide a surge protection apparatus which protects electrical installations as efficiently as possible against transient overvoltages, i.e. for example against voltage peaks which are caused by switching operations in electrical circuits or by electrostatic discharges and are present for a period of nanoseconds and microseconds. This is achieved in that the surge protection apparatus has the lowest possible protection level. This is achieved in that the voltage-limiting protection component is appropriately dimensioned. Accordingly, the rated voltage of the voltage-limiting protection component is at most half the applied nominal voltage, as can be seen from the condition $U_B = U_n/K_x$, as the setting parameter has a value of at least 2. In other words, the voltage-limiting protection component is configured for a maximum of 50% of the permanently applied nominal voltage, since the setting parameter has a value of at least 2. In this respect, the voltage-limiting protection component is defined on the basis of the nominal parameters, namely the nominal voltage $U_n$ and the rated voltage $U_B$.

It has been found that this is possible because the surge protection apparatus also has the voltage-switching protection component in addition to the voltage-limiting protection component. If, on the other hand, the surge protection apparatus had only one of the protection components, for example only the voltage-limiting protection component or only the voltage-switching protection component, this individual protection component would have to be configured to withstand both the mains voltage applied and the occurring mains-frequency overvoltages, and to reliably interrupt any mains follow currents which may occur. The voltage-switching protection component, for example a horn gap, can withstand the applied mains voltage and any occurring mains-frequency overvoltages, the voltage-switching protection component being not subject to any aging effects, as the voltage-switching protection component, if correctly dimensioned, does not permit any unwanted currents which would have a premature wear effect. However, mains follow currents, as a result of proper activation during overvoltages, are a cause of aging or degradation of the voltage-switching protection component.

However, surge protection apparatus known from the prior art, which include series-connected gas discharge arresters ("GDT") and metal-oxide varistors ("MOV"), are not suitable, either, for efficiently protecting electrical installations against transient overvoltages. For this purpose, the metal-oxide varistor ("MOV") would have to be rated as low as possible with regard to the rated voltage thereof, i.e. the 1 mA point on the U/I characteristic curve. However, the gas discharge arrester ("GDT") cannot quench any mains follow current, so that in the event of activation, i.e. when an overvoltage occurs, a mains follow current flows which leads to unwanted wear of the gas discharge arrester ("GDT"), causing the metal-oxide varistor ("MOV") to degrade, which ultimately leads to accelerated aging of the surge protection apparatus, which is why there is no efficient protection. These surge protection apparatus also reach their technical limits with regard to protection against transient overvoltages due to the lack of quenching capacity of the gas discharge arrester, as the metal-oxide varistor would have to be selected with regard to the rated voltage such that, in the activated state, i.e. in the triggered state of the gas discharge arrester, the metal-oxide varistor limits the mains follow current to small follow currents which can be controlled by the gas discharge arrester.

Furthermore, surge protection apparatus are known from the prior art which have a different protection objective, for example a redundant design. These surge protection apparatus thus serve to provide a safe failure behavior if an overload or a so-called "end of life" situation occurs. For this reason, the voltage-limiting protection components in the surge protection apparatus known from the prior art are designed for significantly higher rated voltages (for example, at ⅔ of the applied nominal voltage up to the applied nominal voltage). Consequently, these surge protection apparatus are unsuitable for protecting against transient overvoltages with a correspondingly low protection level. Ultimately, these surge protection apparatus in the prior art have a correspondingly higher protection level, in particular the voltage-limiting protection components.

Consequently, according to the invention, it is provided that the voltage-limiting protection component and the voltage-switching protection component are arranged in a series connection, the voltage-limiting protection component being designed or dimensioned for substantially lower continuous voltages compared to surge protection apparatus known from the prior art which include a voltage-limiting protection component and a voltage-switching protection component.

Due to the series connection of the two protection components, the surge protection apparatus according to the invention can be operated safely at the nominal voltage. Any mains follow currents following a triggering event are safely and immediately interrupted by the voltage-switching protection component, so that no wear of the protection components occurs, as is the case with surge protection apparatus known from the prior art. This also results in a lower load on the mains and also protects against the unintentional triggering of any back-up fuses.

Basically, the surge protection apparatus according to the invention is therefore substantially free from follow currents, free from leakage currents, wear-resistant and stable against aging, which is why the surge protection apparatus efficiently protects electrical installations against transient overvoltages. Substantially free from follow currents means that the surge protection apparatus reliably interrupts mains follow currents with small let-through currents. This can also be referred to as poor in follow currents. In this respect, the voltage-limiting switching component is not subject to any aging-relevant load in normal operation, i.e. the initial state, which is why the surge protection apparatus is wear-resistant.

The initial state of the voltage-switching protection component thus corresponds to normal operation.

The voltage-limiting switching component may be a type II surge arrester.

Accordingly, the voltage-switching protection component cannot be a semiconductor switch or power semiconductor, as the voltage across the voltage-switching protection component drops such that the series-connected voltage-limiting protection component remains free from leakage current. This would not be the case with a semiconductor switch or a power semiconductor.

In this respect, the voltage-switching protection component is not a semiconductor switch or power semiconductor.

Furthermore, the voltage-switching protection component can be connected in series with the voltage-limiting protection component such that no further voltage-switching protection component is provided which is connected to the voltage-limiting protection component (directly or indirectly via a transformer), in particular no further voltage-switching protection component which is connected in parallel with the voltage-switching protection component.

In particular, the voltage-limiting switching component is structurally united with the voltage-switching switching component. The structurally united series connection between the voltage-limiting switching component and the voltage-switching switching component forms a new structural unit which enables the desired tuning for all overload and fault cases.

Basically, the setting parameter is set for the intended application used and the desired protection level and represents a characteristic of the voltage-limiting protection component, as it has been dimensioned according to the desired protection level or field application.

The appropriate dimensioning of the voltage-limiting protection component is a property which can be checked on the protection component itself. In other words, the setting parameter means that the voltage-limiting protection component is configured for normal operation at a voltage X ("nominal voltage") and for trouble-free continuous operation at a voltage Y ("rated voltage").

Usually, the rated voltage is greater than the nominal voltage, which, however, is precisely not provided according to the invention.

Based on the corresponding setting parameter defining the dimensioning of the voltage-limiting protection component, it becomes apparent that the voltage-limiting protection component is actually underdimensioned, since the rated voltage is smaller than the nominal voltage.

One aspect provides that the rated voltage is defined such that a current of 1 mA can flow through the voltage-limiting protection component when the rated voltage is applied. Accordingly, the rated voltage may be selected based on a U/I characteristic curve of the voltage-limiting protection component at a current of 1 mA. The corresponding rated voltage is also referred to as $U_{1\,mA}$ or $U_{MOV}$ for voltage-limiting switching components configured as metal-oxide varistors ("MOV"). In the case of voltage-limiting switching components configured as thyristors, transistors or TVS diodes ("Transient Voltage Suppressor"—TVS), the rated voltage may also be referred to as "breakdown voltage".

Basically, the rated voltage may also be referred to as continuous voltage.

A further aspect provides that the surge protection apparatus, due to the appropriately dimensioned voltage-limiting protection component, together with the voltage-switching protection component, has a protection level which has a value less than three times the peak value of the applied mains voltage. This provides optimum protection for the installation to be protected. At a nominal voltage (e.g. phase-to-phase voltage) of 440 V, the protection level can be a maximum of 1.9 kV, in particular a maximum of 1.5 kV. If the voltage-limiting protection component is configured for a phase-to-earth voltage of 230V, safe operation between the phase conductors is nevertheless possible at UL-L=440V. The achievable protection level in both cases is 1.5 kV. In contrast thereto, the surge protection apparatus known from the prior art have a higher protection level, namely at least 2 kV, due to their design.

According to a further aspect, the voltage-limiting protection component is underdimensioned compared to a surge protection apparatus for protecting an electrical installation from overload. As already explained above, surge protection apparatus known from the prior art for protecting an electrical installation from overload typically have a voltage-limiting protection component having a protection level of at least 2 kV. In this respect, the voltage-limiting protection component of the surge protection apparatus according to the invention is comparatively underdimensioned. However, it is thus possible for the surge protection apparatus to protect the electrical installation from transient overvoltages without causing too much wear on the components.

In this respect, the combination of the underdimensioned voltage-limiting protection component with the voltage-switching protection component represents the most efficient surge protection apparatus for protecting electrical installations from transient overvoltages.

Further, the setting parameter may have a value that is between 2 and 10, in particular between 2 and 5. Preferably, the setting parameter has a value greater than 2.5, for example between 2.6 and 10 or at least 2.6 or greater. The greater the value of the setting parameter, the lower the protection level. The setting parameter can be selected depending on the field of application and the permanently applied nominal voltage. Alternatively or additionally, the setting parameter may be selected depending on the desired protection level despite the same field of application.

According to a further aspect, the surge protection apparatus is TOV resistant, in particular wherein the surge protection apparatus is configured without a thermal disconnecting device. The surge protection apparatus can suppress recurrent voltage peaks below the set protection level, for example by means of switching semiconductors or filter circuits in the control of the voltage-switching protection component. Due to the TOV strength, the availability of the electrical installation can be increased accordingly.

A further aspect provides that the voltage-switching protection component is a switching unit that is free from movable contacts and has at least two fixed switching contacts, in particular a horn gap. In this respect, the voltage-switching protection component has fixed switching contacts, i.e. immovable contacts or no switching element movable between the contacts. Rather, a spark gap can be formed between the fixed switching contacts, provided that a corresponding voltage is applied.

In particular, the switching contacts are spaced apart from each other such that an arc is formed between the switching contacts for each surge current or arresting process, via which the voltage-switching protection component switches to the quasi-closed switching state. In the event of triggering, an arc is therefore formed which remains for the duration of the arresting of the current surge. After that, the arc moves in the direction of the arcing chamber and goes out. The conductive state of the voltage-switching protection component thus results from the arc, which ensures electrical conduction, which is why the voltage-switching protection component switches to the quasi-closed switching state. After the decay of the overvoltage event, any mains follow currents that may occur can be quickly limited to small values by the voltage-switching protection component and then quenched.

The voltage-switching protection component may have a follow-current quenching mains spark gap. The voltage-switching protection component can be formed independently, in particular in a surge protection device. The corresponding surge protection device can be used in AC and DC systems.

The voltage-limiting protection component may be formed as a metal-oxide varistor ("MOV"). Alternatively, the voltage-limiting protection component may be formed by a thyristor, a transistor or a TVS diode, in particular a structural element having a continuous U/I characteristic curve.

The surge protection apparatus may be provided for direct voltages ("DC applications"). This is possible only to a very limited extent with the surge protection apparatus known from the prior art, which have a series connection of a gas discharge arrester ("GDT") and a metal-oxide varistor ("MOV"), since the gas discharge arrester ("GDT") has no DC quenching capacity and the MOV must be rated so high that the series connection has a high (poor) protection level.

Basically, the surge protection apparatus ensures that in the normal operation of the surge protection apparatus, the mains voltage drops across the voltage-switching protection component and thus the voltage-limiting protection component is not exposed to the mains voltage or disconnected from the mains. Consequently, no leakage current flows during normal operation, as a result of which the service life of the voltage-limiting protection component can be extended accordingly. In particular, a thermally activated disconnecting device can be dispensed with. However, the thermally activated disconnecting device may be provided for normative reasons.

The surge protection apparatus may have two separately formed surge protection devices ("SPD") connected in series. The first surge protection device includes the voltage-limiting protection component. The second surge protection device includes the voltage-switching protection component. In this respect, the surge protection apparatus can be formed by two separate surge protection devices that are connected in series, with the protection components each being assigned to one surge protection device.

Alternatively, both protection components are arranged in a single surge protection device ("SPD"), i.e. housed in a common housing.

In addition, the invention provides the use of the surge protection apparatus to protect an electrical installation from transient overvoltages. The surge protection apparatus has a voltage-limiting protection component and additionally a voltage-switching protection component. The voltage-limiting protection component and the voltage-switching protection component are connected in series. The voltage-switching protection component is configured such that the voltage-switching protection component switches to a quasi-closed switching state for each surge current or arresting process. The voltage-switching protection component is configured such that a voltage applied to the voltage-switching protection component drops across the voltage-switching protection component in the initial state thereof such that the series-connected voltage-limiting protection component remains free from leakage currents. The voltage-switching protection component is configured to at least limit, in particular to interrupt, occurring mains follow currents. It is not known from the prior art to use such a surge protection apparatus to protect an electrical installation from transient overvoltages.

In particular, it is not known to appropriately dimension or design the surge protection apparatus, namely the voltage-limiting protection component, to effectively and efficiently protect the electrical installation from transient overvoltages, while not impairing the further protective functions.

For example, the aforementioned surge protection apparatus is used to protect an electrical installation from transient overvoltages.

In principle, the protection components may be selected such that an adjustment is made between lifetime (wear) and protection level, i.e. the surge protection apparatus is configured accordingly. Consequently, the setting parameter may also be considered as an indicator of lifetime and/or protection effect or protection level.

Furthermore, a PLC ("Power Line Communication") is basically not affected because there is only a small capacitance between the conductors. This is because the surge protection apparatus has only a small total capacitance due to the series connection of the voltage-limiting protection component and the voltage-switching protection component, in particular the horn gap. The spark gap of the horn gap represents a capacitor with relatively large electrode spacing, small area and air dielectric.

BRIEF DESCRIPTION OF THE SEVERAL VIEWS OF THE DRAWINGS

Further advantages and features of the invention will become apparent from the description below and the drawings to which reference is made and in which.

DETAILED DESCRIPTION OF THE INVENTION

Figure 1:
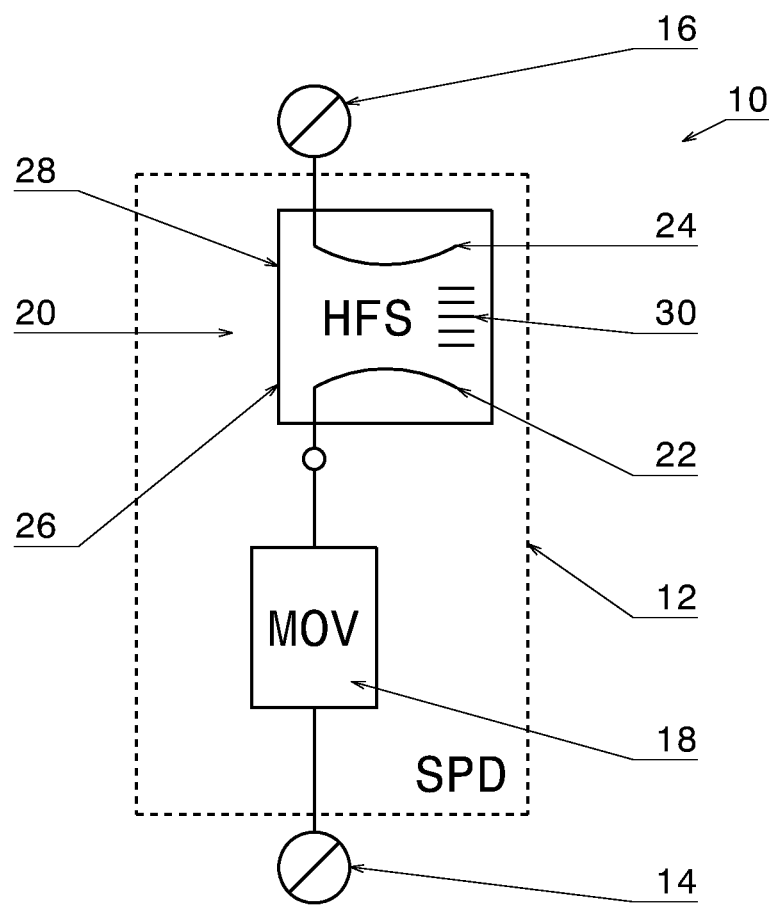
FIG. 1 shows a schematic representation of a surge protection apparatus according to the invention for protecting an electrical installation against transient overvoltages according to a first embodiment.

FIG. 1 shows a surge protection apparatus 10 for protecting an electrical installation against transient overvoltages.

The surge protection apparatus 10 has a housing 12 including a first terminal 14 and a second terminal 16, which can also be referred to as external terminals, via which the surge protection apparatus 10 can be connected in parallel with the electrical installation to be protected.

In addition, the surge protection apparatus 10 comprises a voltage-limiting protection component 18, which is connected in series with a voltage-switching protection component 20. Both protection components 18, 20 are arranged within the housing 12.

The voltage-limiting protection component 18 is configured as a surge protection component.

In the embodiment shown, the voltage-limiting protection component 18 is a metal-oxide varistor ("MOV"). In this respect, the surge protection apparatus 10 is of type II. Alternatively, the voltage-limiting protection component 18 may be configured as a thyristor, a transistor or a TVS diode ("Transient Voltage Suppressor"—TVS).

In the embodiment shown, the voltage-switching protection component 20 includes two fixed switching contacts 22, 24 so that the voltage-switching protection component 20 is free from movable contacts. In other words, the voltage-switching protection component 20 is a switching unit 26 free from movable contacts.

In the embodiment shown, the voltage-switching protection component 20 is configured as a horn gap ("HFS") 28, wherein an arc 30 can be generated between the two fixed switching contacts 22, 24 in the event of triggering, which is indicated accordingly in FIG. 1. For this purpose, the switching contacts 22, 24 are spaced apart from each other such that the arc 30 is formed for each surge current or arresting process. Provided that the arc 30 is formed, the voltage-switching protection component 20 switches to a quasi-closed switching state, as a result of which the surge protection apparatus 10 becomes electrically conductive.

In addition, the voltage-switching protection component 20 is configured such that occurring mains follow currents are at least limited, in particular interrupted. It is thus ensured that the series-connected voltage-limiting protection component 18 does not wear out.

In the initial state of the surge protection apparatus 10, the voltage applied to the terminals 14, 16 drops across the voltage-switching protection component 20, so that the voltage-limiting protection component 18, which is connected in series, remains free from leakage currents and is not subjected to any stresses. It is thus ensured that no aging effects or wear effects occur on the voltage-limiting protection component 18.

Therefore, the surge protection apparatus 10 is substantially free from follow currents, free from leakage currents, resistant to wear or stable against aging.

In the final analysis, the surge protection apparatus 10 reliably interrupts any mains follow currents with extremely small let-through currents, which is why the surge protection apparatus 10 is quasi free from or poor in follow currents and thus wear-resistant.

In addition, the voltage-limiting protection component 18 is configured to be underdimensioned so that the entire surge protection apparatus 10 protects the electrical installation from transient overvoltages.

The appropriate dimensioning of the voltage-limiting protection component 18 ensures that the surge protection apparatus 10 has a protection level that has a value less than three times the peak value of the applied mains voltage. Using the example of a 230/440V low-voltage mains, this means that the value of the protection level is at most 1.9 kV, in particular at most 1.5 kV.

This is achieved by the voltage-limiting protection component 18 satisfying the condition $U_B=U_n/K_x$, where $U_B$ is the rated voltage of the voltage-limiting protection component 18, $U_n$ is a nominal voltage applied to the voltage-limiting protection component 18, and $K_x$ is a setting parameter the value of which is at least 2. In principle, the value of the setting parameter may be between 2 and 10, in particular between 2 and 5.

The rated voltage may be defined such that a current of 1 mA may flow through the voltage-limiting protection component 18 when the rated voltage is applied. In this respect, the rated voltage is also referred to as $U_{1\ mA}$ or $U_{MOV}$ if the voltage-limiting switching component is configured as a metal-oxide varistor ("MOV"). If the voltage-limiting switching component is a thyristor, a transistor or a TVS diode ("transient voltage suppressor"), the rated voltage can also be referred to as breakdown voltage.

It is thus ensured that the voltage-limiting protection component 18 becomes effective in comparison with surge protection apparatus 10 with higher protection levels, as is known from the prior art, the installation being thus also better protected against transient overvoltages. The surge protection apparatus known from the prior art have not been provided or configured therefor so far.

Furthermore, the surge protection apparatus 10 is TOV resistant, in particular wherein the surge protection apparatus 10 is configured without a thermal disconnecting device. Consequently, recurrent voltage peaks below the set protection level can be effectively suppressed by the surge protection apparatus 10.

Figure 2:
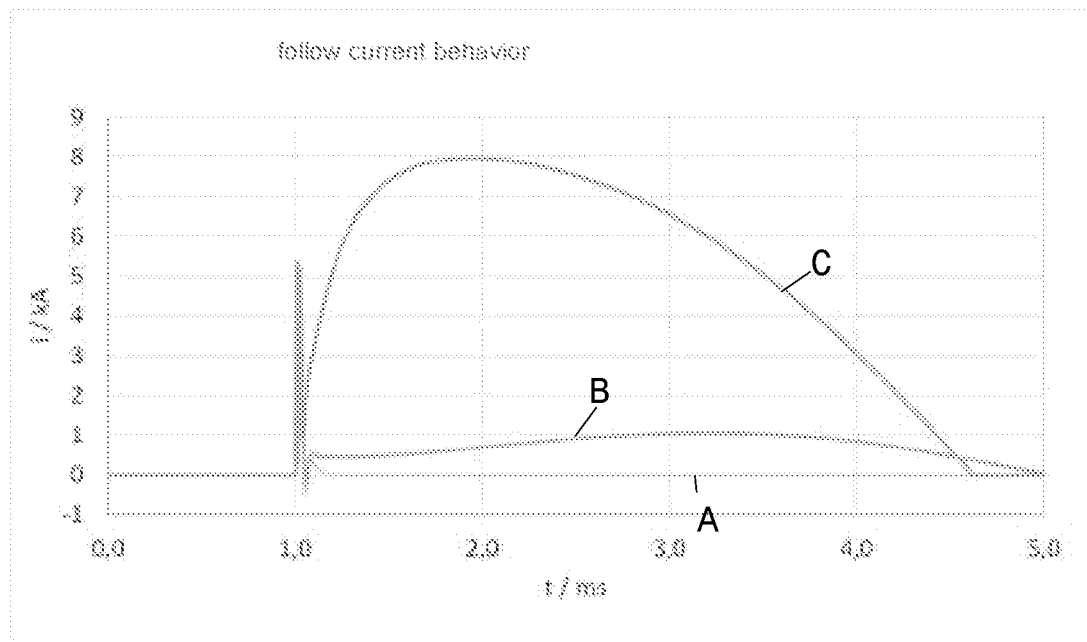
FIG. 2 shows an overview showing the follow current behavior of the surge protection apparatus according to the invention in comparison with two surge protection apparatus from the prior art.

FIG. 2 shows the follow current behavior of the surge protection apparatus 10 according to FIG. 1, i.e. with a correspondingly dimensioned voltage-limiting protection component 18. The corresponding follow current behavior of the surge protection apparatus 10 according to FIG. 1 is shown with curve "A".

In addition, the follow current behavior of a surge protection apparatus which has only one appropriately dimensioned voltage-limiting protection component (curve "B") and of a surge protection apparatus which has only one voltage-switching protection component (curve "C") are shown.

From the comparison of the three follow current behaviors, it is apparent that the surge protection apparatus 10 according to the invention of FIG. 1 exhibits the clearly best follow current behavior.

Figure 3:
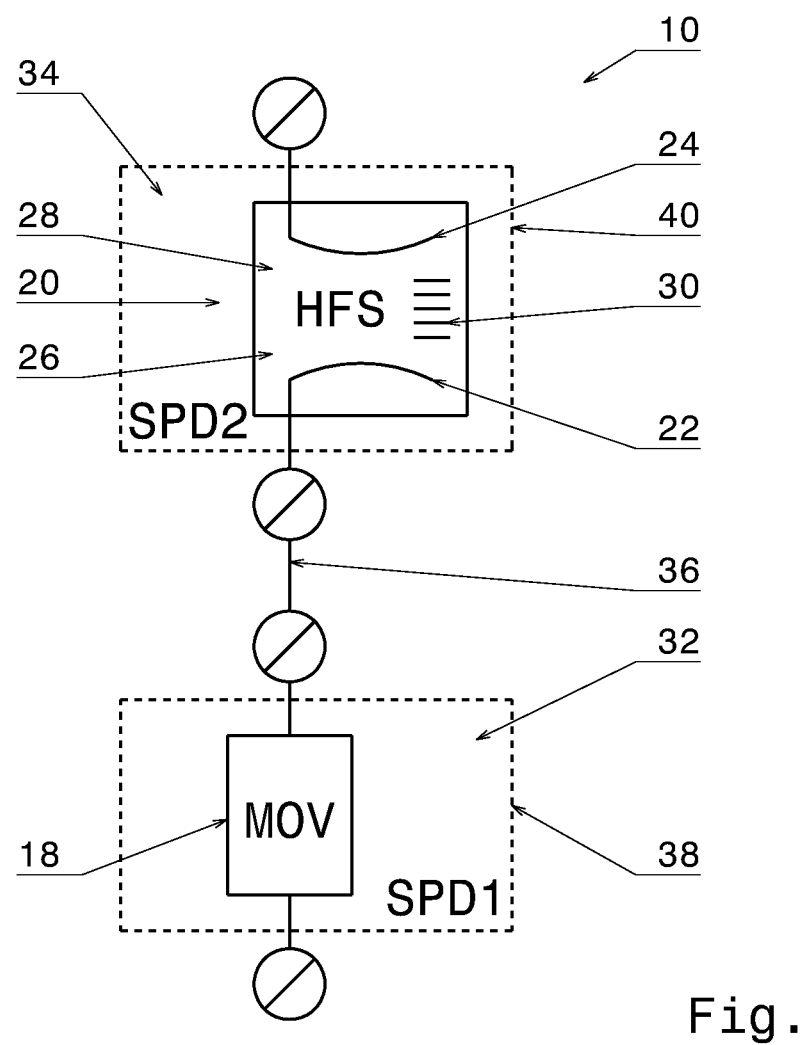
FIG. 3 shows a schematic representation of a surge protection apparatus according to the invention for protecting an electrical installation against transient overvoltages according to a second embodiment.

FIG. 3 also shows a second embodiment which differs from the embodiment shown in FIG. 1 in that the surge protection apparatus 10 includes two separately configured surge protection devices 32, 34 which are connected in series by means of a connection 36.

The surge protection devices 32, 34 may each have their own housing 38, 40 in which a respective voltage-limiting protection component 18 and voltage-switching protection component 20 is accommodated.

In this respect, a first surge protection device 32 is provided which has the voltage-limiting protection component 18, in particular the metal-oxide varistor ("MOV"), whereas the second surge protection device 34 has the voltage-switching protection component 20, in particular the horn gap ("HFS").

Accordingly, the embodiments shown in FIGS. 1 and 3 differ in that the protection components 18, 20 in the embodiment shown in FIG. 1 are arranged in a common surge protection device ("SPD"), in particular a common housing. In contrast thereto, in the embodiment shown in FIG. 3, the two protection components 18, 20 are provided separately from each other in the two surge protection devices 32, 34 ("SPD"), in particular in the respective housing 38, 40 of the corresponding surge protection device 32, 34.

However, the mode of operation is identical in both embodiments, so that reference is made to the explanations regarding FIG. 1.

What is claimed is:

1. A surge protection apparatus for protecting an electrical installation against transient overvoltages, having a voltage-limiting protection component (18) and additionally a voltage-switching protection component (20), the voltage-limiting protection component (18) and the voltage-switching protection component (20) being connected in series, the voltage-switching protection component (20) being configured such that the voltage-switching protection component (20) switches to a quasi-closed switching state for each surge current or arresting process, wherein the voltage-switching protection component (20) is configured such that a voltage applied to the voltage-switching protection component (20) drops across the voltage-switching protection component (20) in the initial state thereof such that the series-connected voltage-limiting protection component (18) remains free from leakage current, wherein the voltage-switching protection component (20) is configured to at least limit occurring mains follow currents, wherein the voltage-limiting protection component (18) is dimensioned such that the voltage-limiting protection component (18) satisfies the condition $U_B=U_n/K_x$, where $U_B$ is the rated voltage of the voltage-limiting protection component (18), $U_n$ is a nominal voltage applied to the voltage-limiting protection component (18), and $K_x$ is a setting parameter the value of which is at least 2, and wherein the voltage-limiting protection component (18) is configured to be underdimensioned so that the surge protection apparatus (10) protects the electrical installation from transient overvoltages.

2. The surge protection apparatus according to claim 1, characterized in that the rated voltage is defined such that a current of 1 mA can flow across the voltage-limiting protection component (18) at the rated voltage.

3. The surge protection apparatus according to claim 1, characterized in that the surge protection apparatus (10), due to the appropriately dimensioned voltage-limiting protection component (18), together with the voltage-switching protection component (20) has a protection level which has a value less than three times the peak value of the applied mains voltage.

4. The surge protection apparatus according to claim 1, characterized in that the setting parameter has a value which is one of between 2 and 10 and between 2 and 5.

5. The surge protection apparatus according to claim 1, characterized in that the surge protection apparatus (10) is transient overvoltage resistant, in particular wherein the surge protection apparatus (10) is configured without a thermal disconnecting device.

6. The surge protection apparatus according to claim 1, characterized in that the voltage-switching protection component (20) is a switching unit (26) which is free from movable contacts and has at least two fixed switching contacts (22, 24), in particular a horn gap (28).

7. The surge protection apparatus according to claim 6, characterized in that the switching contacts (22, 24) are spaced apart from each other such that an arc (30) is formed between the switching contacts (22, 24) for each surge current or arresting process, via which the voltage-switching protection component (20) switches to the quasi-closed switching state.

8. The surge protection apparatus according to claim 1, characterized in that the voltage-switching protection component (20) has a follow-current quenching mains spark gap.

9. The surge protection apparatus according to claim 1, characterized in that the voltage-limiting protection component (18) is configured as a metal-oxide varistor.

10. The surge protection apparatus according to claim 1, characterized in that the surge protection apparatus (10) has two separately formed surge protection devices (32, 34) which are connected in series, the first surge protection device (32) including the voltage-limiting protection component (18), and the second surge protection device (34) including the voltage-switching protection component (20).

11. A method of using a surge protection apparatus (10) to protect an electrical installation against transient overvoltages, the surge protection apparatus (10) having a voltage-limiting protection component (18) and additionally a voltage-switching protection component (20), the voltage-limiting protection component (18) and the voltage-switching protection component (20) being connected in series, the voltage-switching protection component (20) switching to a quasi-closed switching state for each surge current or arresting process, the voltage-switching protection component (20) being configured such that a voltage applied to the voltage-switching protection component (20) drops across the voltage-switching protection component (20) in the initial state thereof such that the series-connected voltage-limiting protection component (18) remains free from leakage current, wherein the voltage-switching protection component (20) of the surge protection apparatus (10) at least limits occurring mains follow currents, wherein the voltage-limiting protection component (18) is dimensioned such that the voltage-limiting protection component (18) satisfies the condition $U_B = U_n/K_x$, where $U_B$ is the rated voltage of the voltage-limiting protection component (18), $U_n$ is a nominal voltage applied to the voltage-limiting protection component (18), and $K_x$ is a setting parameter the value of which is at least 2, and wherein the voltage-limiting protection component (18) is underdimensioned so that the surge protection apparatus (10) protects the electrical installation from transient overvoltages.

12. A surge protection apparatus for protecting an electrical installation against transient overvoltages, having a voltage-limiting protection component (18) and additionally a voltage-switching protection component (20), the voltage-limiting protection component (18) and the voltage-switching protection component (20) being connected in series,
the voltage-switching protection component (20) being configured such that the voltage-switching protection component (20) switches to a quasi-closed switching state for each surge current or arresting process, and
wherein the voltage-switching protection component (20) is configured such that a voltage applied to the voltage-switching protection component (20) drops across the voltage-switching protection component (20) in the initial state thereof such that the series-connected voltage-limiting protection component (18) remains free from leakage current,
wherein the voltage-switching protection component (20) is configured to at least limit occurring mains follow currents,
wherein the voltage-limiting protection component (18) is dimensioned such that the voltage-limiting protection component (18) satisfies the condition $U_B = U_n/K_x$, where $U_B$ is the rated voltage of the voltage-limiting protection component (18), $U_n$ is a nominal voltage applied to the voltage-limiting protection component (18), and $K_x$ is a setting parameter the value of which is at least 2 such that the rated voltage is smaller than the nominal voltage, and
wherein the surge protection apparatus (10) is capable of protecting the electrical installation from transient overvoltages.

13. The surge protection apparatus according to claim 1, characterized in that the voltage-limiting protection component (18) is configured for a maximum of 50% of the applied nominal voltage.

14. The surge protection apparatus according to claim 1, characterized in that the surge protection apparatus (10) is free from follow currents, free from leakage currents, wear-resistant and stable against aging so that the surge protection apparatus (10) efficiently protects electrical installations against transient overvoltages.

15. The surge protection apparatus according to claim 1, characterized in that the surge protection apparatus (10) has a protection level that is a maximum of 1.9 kV.

16. The surge protection apparatus according to claim 12, characterized in that the voltage-limiting protection component (18) is configured for a maximum of 50% of the applied nominal voltage.

17. The surge protection apparatus according to claim 12, characterized in that the surge protection apparatus (10) is free from follow currents, free from leakage currents, wear-resistant and stable against aging so that the surge protection apparatus (10) efficiently protects electrical installations against transient overvoltages.

18. The surge protection apparatus according to claim 12, characterized in that the surge protection apparatus (10) has a protection level that is a maximum of 1.9 kV.

* * * * *